United States Patent
Yamada et al.

(10) Patent No.: US 9,940,484 B2
(45) Date of Patent: Apr. 10, 2018

(54) TECHNIQUES FOR DETECTING FALSE POSITIVE RETURN-ORIENTED PROGRAMMING ATTACKS

(71) Applicant: INTEL CORPORATION, Santa Clara, CA (US)

(72) Inventors: Koichi Yamada, Los Gatos, CA (US); Palanivelrajan Shanmugavelayutham, San Jose, CA (US); Lior Malka, San Jose, CA (US); Ashish Bijlani, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 358 days.

(21) Appl. No.: 14/582,114

(22) Filed: Dec. 23, 2014

(65) Prior Publication Data
US 2016/0180115 A1     Jun. 23, 2016

(51) Int. Cl.
| | |
|---|---|
| G06F 21/56 | (2013.01) |
| G06F 21/80 | (2013.01) |
| G06F 12/14 | (2006.01) |
| G06F 13/42 | (2006.01) |
| G06F 13/40 | (2006.01) |
| G06F 13/38 | (2006.01) |

(Continued)

(52) U.S. Cl.
CPC ........ *G06F 21/805* (2013.01); *G06F 12/1483* (2013.01); *G06F 13/387* (2013.01); *G06F 13/404* (2013.01); *G06F 13/4282* (2013.01); *G06F 21/54* (2013.01); *G06F 21/552* (2013.01); *G06F 21/85* (2013.01); *G06F 2221/2101* (2013.01)

(58) Field of Classification Search
CPC .. G06F 21/805; G06F 12/1483; G06F 13/404; G06F 13/387; G06F 21/54
USPC ...................................... 726/22–23
See application file for complete search history.

(56) References Cited

U.S. PATENT DOCUMENTS

| | | | | |
|---|---|---|---|---|
| 4,498,082 A | * | 2/1985 | Aldridge | ............... H04L 12/437 340/8.1 |
| 5,412,721 A | * | 5/1995 | Rager | ................... H04L 9/0897 380/273 |

(Continued)

OTHER PUBLICATIONS

Size Does Matter: Why Using Gadget-Chain Length to Prevent Code-Reuse Attacks is Hard, 23rd USENIX Security Symposium, Aug. 20-22, 2014, by Goktas et al.*

(Continued)

*Primary Examiner* — Paul R Myers

(57) ABSTRACT

Various embodiments are generally directed to an apparatus, method and other techniques to determine whether a target address of a register for an execution instruction is valid or invalid based on a comparison between the target address and one or more valid target addresses stored in a storage, increase a number of invalid target addresses if the target address is invalid, and determine whether the number of invalid target addresses is greater than an invalid target address threshold. Various embodiments may also include initiating a security measure to prevent a security breach if the number of invalid target addresses is greater than the invalid target address threshold or executing the execution instruction if the number of invalid target addresses is less than or equal to the invalid target address threshold.

25 Claims, 11 Drawing Sheets

(51) Int. Cl.
*G06F 21/85* (2013.01)
*G06F 21/55* (2013.01)
*G06F 21/54* (2013.01)

(56) References Cited

U.S. PATENT DOCUMENTS

| | | | | |
|---|---|---|---|---|
| 6,412,071 | B1* | 6/2002 | Hollander | G06F 9/4425 |
| | | | | 711/E12.101 |
| 2005/0010804 | A1* | 1/2005 | Bruening | G06F 21/52 |
| | | | | 726/1 |
| 2005/0144471 | A1* | 6/2005 | Shupak | G06F 21/52 |
| | | | | 713/193 |
| 2008/0229429 | A1* | 9/2008 | Krig | G06F 11/08 |
| | | | | 726/27 |
| 2013/0117843 | A1* | 5/2013 | Komaromy | G06F 21/52 |
| | | | | 726/22 |
| 2014/0096245 | A1* | 4/2014 | Fischer | G06F 21/52 |
| | | | | 726/23 |
| 2014/0344932 | A1* | 11/2014 | Polychronakis | G06F 21/54 |
| | | | | 726/23 |
| 2015/0095628 | A1* | 4/2015 | Yamada | G06F 21/54 |
| | | | | 712/234 |
| 2015/0215335 | A1* | 7/2015 | Giuliani | H04L 63/1441 |
| | | | | 726/23 |
| 2015/0339480 | A1* | 11/2015 | Lutas | G06F 21/56 |
| | | | | 726/22 |
| 2015/0356294 | A1* | 12/2015 | Tan | G06F 8/427 |
| | | | | 726/22 |
| 2016/0034687 | A1* | 2/2016 | Rhee | G06F 21/52 |
| | | | | 726/23 |
| 2016/0196427 | A1* | 7/2016 | Davidov | G06F 21/54 |
| | | | | 726/23 |

OTHER PUBLICATIONS

Switching the Gadgets: On the Ineffectivness of Cource-Grained Control Flow Integrity Protection, 23rd USENIX Security Symposium, Aug. 20-22, 2014, by Davi et al.*
Security Breaches as PMU Deviation: Detecting and Identifying Security Attacks Using Performance Counters. Jul. 11-12, 2011, by Yuan et al.*
Hardware-Assisted Fine-Grained Control Flow Integrity: Towards Efficient Protection of Embedded Systems Against Software Exploitation. Jun 1-5, 2014, by Davi et al.*
CFIMon: Detecting Violation of Contol Flow Integrity using Performance Counters, Jun. 25, 2012 by Xia et al.*
ROPecker: A Generic and Practical Approch for Defending Against ROP Attacks, Feb. 23-26, 2014 , by Cheng et al.*

* cited by examiner

900

DETERMINE WHETHER A TARGET ADDRESS OF A REGISTER FOR AN EXECUTION INSTRUCTION IS VALID OR INVALID BASED ON A COMPARISON BETWEEN THE TARGET ADDRESS AND ONE OR MORE VALID TARGET ADDRESSES STORED IN A STORAGE
905

INCREASE A NUMBER OF INVALID TARGET ADDRESSES IF THE TARGET ADDRESS IS INVALID
910

DETERMINE WHETHER THE NUMBER OF INVALID TARGET ADDRESSES IS GREATER THAN AN INVALID TARGET ADDRESS THRESHOLD
915

INITIATE A SECURITY MEASURE TO PREVENT A SECURITY BREACH IF THE NUMBER OF INVALID TARGET ADDRESSES IS GREATER THAN THE INVALID TARGET ADDRESS THRESHOLD
920

EXECUTE THE EXECUTION INSTRUCTION IF THE NUMBER OF INVALID TARGET ADDRESSES IS LESS THAN OR EQUAL TO THE INVALID TARGET ADDRESS THRESHOLD
925

FIG. 9

TECHNIQUES FOR DETECTING FALSE POSITIVE RETURN-ORIENTED PROGRAMMING ATTACKS

TECHNICAL FIELD

Embodiments described herein generally relate to techniques for detecting malware and virus attacks against computing systems and for determining false positive attacks.

BACKGROUND

Computer exploits are techniques which may be used to compromise the security of a computer system or data. Such exploits may take advantage of a vulnerability of a computer system in order to cause unintended or unanticipated behavior to occur on the computer system. For example, during a Return-Oriented Programming (ROP) attack a series of snippets of code that are already available in executable memory (e.g., portions of existing library code), and which are followed by a return instruction (e.g., a RET instruction) may be chained together into a desired execution sequence by pushing a series of pointer values onto the call stack and then tricking the code into execution the first pointer value. This chained execution sequence does not follow the intended program execution order that the original program author intended, but may instead follow an alternative execution sequence. In this manner, an attacker may create a virtual program sequence without requiring injection of external code.

BRIEF DESCRIPTION OF THE DRAWINGS

FIG. 9 illustrates a second embodiment of a logic flow diagram.

DETAILED DESCRIPTION

Figure 1:
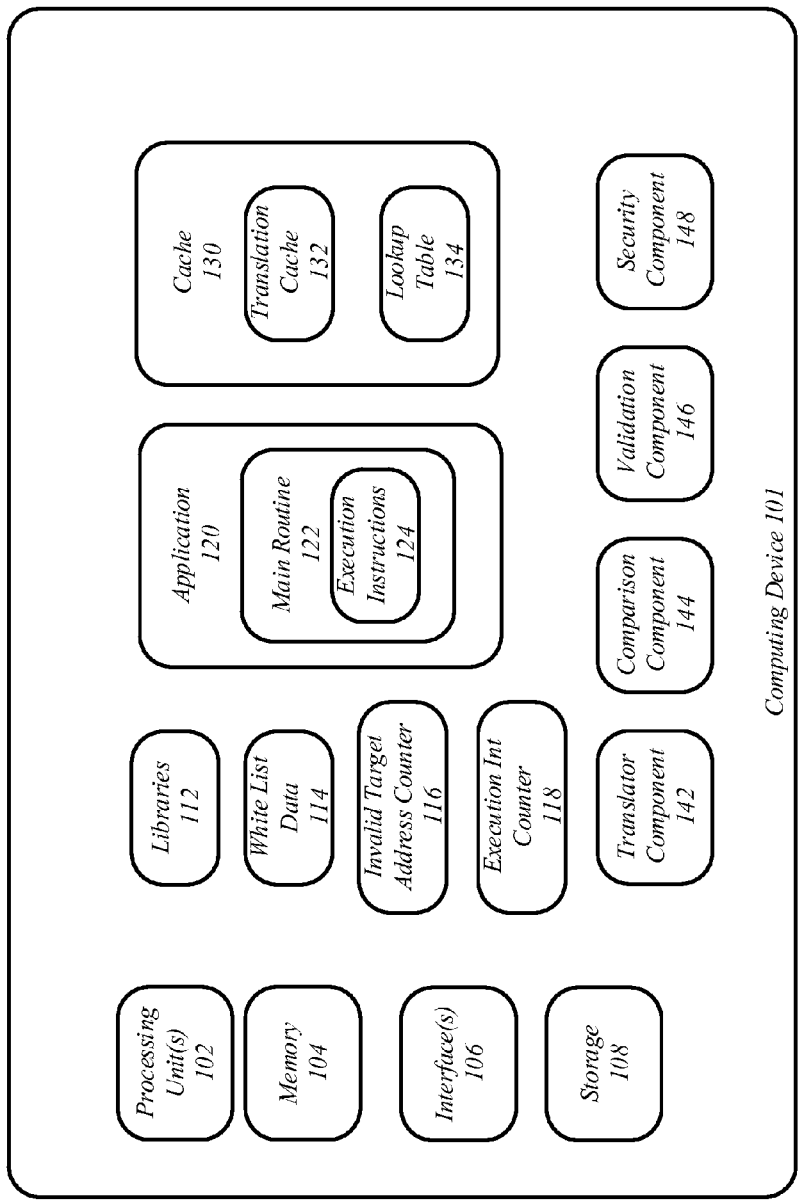
FIG. 1 illustrates an embodiment of a computing device.

Various embodiments are generally directed to an apparatus, system and method to detect various types of code reuse attacks including return-oriented programming (ROP) attacks. More specifically, valid target addresses for branch instructions may be determined either prior to or during execution of instructions for applications and then validated. However, in some instances, a target address may be determined as invalid even though it is a valid target address. For example, a target address for an instruction may change between when the determination process when the valid target address is determined and the validation process. Therefore, during the validation process the target address may be indicated as invalid, however, it is actually a valid target address. Some embodiments are directed to detecting these false-positive detections.

As discussed, during a ROP attack a series of snippets of code that are already available in executable memory (e.g., portions of existing library code), and which are followed by a return instruction (e.g., a RET instruction) may be chained together into a desired execution sequence. Moreover, one of the hallmarks of an ROP attack is that a number of redirecting instructions may be used to take over control flow. These redirecting instruction may occur in a row, or in some cases, valid instructions may be permitted to be executed in between redirecting instructions during an attack to try to prevent detection of the attack. Thus, some embodiments may be directed to using a two counter approach to filter out false positives from actual ROP attacks.

For example, some embodiments may include an invalid target address counter to track a number of detected invalid target addresses. Additional, an execution instruction counter may be utilized to determine a number of valid execution instructions executed in-between each invalid target address detection. Only when both counters reach determined threshold values will a security measure be initiated, for example. Thus, the two-counter approach may be used to filter out a false-positive attack while also detecting an attackers attempt to insert valid execution instruction in-between redirecting instructions. These and other details will become more apparent with the following description.

Various embodiments also relate to an apparatus or systems for performing these operations. This apparatus may be specially constructed for the required purpose or it may include a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an embodiment of a computing device 101 to process information and data. In some embodiments, computing device 101 may include a number of components, modules and processing circuitry to detect and process return-oriented programming (ROP) attacks by verifying target addresses of instructions. Computing device 101 may also include a number of components to detect and manage false positive detections of ROP attacks.

Computing device 101 may include one or more processing units 102, memory 104, one or more interfaces 106 and storage 108. In some embodiments, the one or more processing units 102 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The one or more processing units 102 may be connected to and communicate with the other elements of the computing device 101 via interconnects (now shown), such as one or more buses, control lines, and data lines. In some embodiments, the one or more processing units 102 may include processor registers or a small amount of storage available the processing units to store information including instructions that and can be accessed during execution. Moreover, processor registers are normally at the top of the memory hierarchy, and provide the fastest way to access data.

As mentioned, the computing device 101 may include memory 104 to store information. Further, memory 104 may be implemented using any machine-readable or computer-readable media capable of storing data, including both volatile and non-volatile memory. In some embodiments, the machine-readable or computer-readable medium may include a non-transitory medium. The embodiments are not limited in this context.

The memory 104 can store data momentarily, temporarily, or permanently. The memory 104 stores instructions and data for computing device 101. The memory 104 may also store temporary variables or other intermediate information while the one or more processing units 102 is executing instructions. In some embodiments, information and data may be loaded from memory 104 into the computing registers during processing of instructions. Manipulated data is then often stored back in memory 104, either by the same instruction or a subsequent one. The memory 104 is not limited to storing the above discussed data; the memory 104 may store any type of data.

The one or more interfaces 106 includes any device and circuitry for processing information or communications over wireless and wired connections. For example, the one or more interfaces 106 may include a receiver, a transmitter, one or more antennas, and one or more Ethernet connections. The specific design and implementation of the one or more interfaces 106 may be dependent upon the communications network in which the computing device 101 is intended to operate.

For example, the computing device 101 may include a communication interface designed to operate in GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth. data communications networks, and also designed to operate with any of a variety of voice communications networks, such as may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth. Other types of data and voice networks, both separate and integrated, may also be utilized with computing device 101. The computing device 101 may also be compliant with other communications standards such as 3GSM, 3GPP, UMTS, 4G, etc. In some embodiments, the computing device 101 may be designed to operate in a plurality of communications networks and is not limited to a specific network.

In various embodiments, the one or more interfaces 106 may include one or more I/O controllers (not shown) to output any signals and information. The I/O controller may enable communication over wireless and wired connections. In various embodiments, the I/O controller may be separate component or module of computing device 101.

Computing device 101 may include storage 108 which may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 108 may include technology to increase the storage performance enhanced protection for valuable digital media when multiple hard drives are included, for example. Further examples of storage 108 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

Further and as illustrated in FIG. 1, the computing device 101 may include a number of components and modules to store and process information and instructions to detect and manage ROP attacks. For example, computing device 101 may include a translator component 142, a comparison component 144, a validation component 146 and a security component 148. Computing device 101 may also include one or more libraries 112, white list data 114, an invalid target address counter 116, and an execution instruction counter 118. The computing device 101 may also include one or more applications 120 that each may have a main routine 122 and execution instructions 124 that can be executed and process information and data. In some embodiments, the computing device 101 may also include cache 130 having a translator cache 132 and one or more lookup tables 134 which may be stored in storage 108 and/or memory 104.

As will become apparent with the following description, the components, libraries, data, counters, and cache may be utilized to detect and manage ROP attacks of applications. Further and in some embodiments, one or more components, such as the translator component 142, the comparison component 144, the validation component 146, and the security component, may be stored in storage 108. Similarly, libraries 112, white list data 114, counters 116 and 118, and the application 120 including the main routine 122 and execution instructions 124 may also be stored in storage 108 and executed while in memory 104. However, various embodiments are not limited in this manner and in some embodiments the components, libraries 112, white list data 114, counters 116 and 118, and applications 120 may be stored in memory 104 or remotely and accessed via one or more wireless or wired connections.

In various embodiments, the computing device 101 including the translator component 142, the comparison component 144, the validation component 146 and the security component 148 may be used to detect ROP attacks, detect false positive, perform security measures, and so forth for applications 120 executing on computing device 101. Applications 120 may be any type of application including, but not limited to, word processing applications, spreadsheet applications, database applications, gaming applications, business applications, drafting applications, portable document format applications, Internet applications, web-based applications, email applications, and so forth.

Each of the applications 120 may execute a main routine 122 which may incorporate a sequence of execution instructions 124 operative on the one or more processing units 102 in its role as a main processor component of the computing device 101 to implement logic to perform various functions. The execution instructions 124 may be loaded into memory 104 or one or more registers of the processing units 102 to execute tasks and operations for a particular application. To detect a ROP attack, target addresses of instructions may be verified to ensure ROP malware does not take over control flow of the execution instructions and main routine. To verify target addresses, valid target addresses of the main routine 122 including the execution instructions 124 and libraries 112 may be determined during a translation operation or routine and stored in cache 130.

More specifically, the computing device 101 may include a translation component 142 to perform a translation routine to translate portions of one or both of the main routine 122 and the libraries 112 into translated portions which may be stored in a translation cache 132 for execution. It is during translation that target addresses of variables and instructions are generally derived. Thus, for direct branch instructions, i.e. instructions specifying targets with offsets, the target addresses of their targets are calculated during translation, and those target addresses are directly incorporated into those direct branch instructions as portions of routines are placed in the translation cache 132.

For at least some indirect branch instructions that incorporate an identifier of their intended targets, the translation component 142 attempts to determine their target addresses by using those identifiers to refer to one or more tables, such as an entry point table to retrieve target addresses therefrom that are known to be valid.

In some embodiments, the translation component 142 may use identifiers incorporated into indirect branch instructions to retrieve indications of target addresses known to be valid from one or more alternate or additional tables such as the whitelist data 114. For example, one or more sizable libraries, such as libraries 112, may be included with an operating system that may normally be stored at predictable addresses locations in storages across a variety of computing devices. Due to the reliance of what may be a great many other routines on the function routines of those libraries, those who create those libraries are likely to make changes to those libraries only very infrequently for fear of causing unforeseen and undesirable effects on the other routines that use them. Thus, the content of such libraries tends to change only infrequently over time such that it becomes feasible to construct a viable whitelist, such as white list data 114, of valid target of the function routines and execution instructions 124 to which a branch instruction may validly jump.

Further and in some embodiments, the translation component 142 can derive valid target addresses once the addresses of libraries, such as libraries 112 are known. More specifically, the white list data 114 may be populated and/or filled with indications of valid target addresses as the address locations the libraries 112 are determined. It should also be noted that tables, white list data 114, and so forth may be implemented as any of a variety of types of data structure in which indications of valid target addresses may be stored in any of a variety of formats.

In various embodiments, the translation component 142 may store the valid target addresses for the direct and indirect branch instructions in cache 130, and in particular, a lookup table 134. The lookup table 134 may be any type of lookup table including a fast lookup table which may be used during execution of an application 120 to validate target addresses for instructions. For example, during execution the target address of an instruction, such as a return (RET) instruction, may be verified by a validation component 146 by a comparison made between the target address of the instruction and a valid known target address stored in lookup table 134. In some embodiments, the valid RET target address may be dynamically populated in the lookup table 134 when a call (CALL) instruction is executed. The CALL instruction may indicate the next target address after the CALL instruction is the valid target address following the RET instruction.

In some embodiments, the computing device 101 may include a validation component 146 which may be used to verify target addresses for both direct and indirect branch instructions, such as call (CALL) instructions, jump (JMP) instruction, and RET instructions. When there is a match between a target address of an executing instruction and a valid target address in lookup table 134, the instruction may be allowed to be executed. However, if the target address cannot be verified by the validation component 146 further evaluation may be required to determine if an ROP attack is being attempted or not. In some embodiments, a target address may not be validated by the validation component 146 however it may be a valid target address. For example, a target address for an instruction may have changed during the time between the translation and execution of a main routine 122 and execution instructions 124 for an application 120. Thus various embodiments may be directed to determining and managing these false positive cases.

One of the hallmarks of an ROP attack is that a number of redirecting instructions may be used to take over control flow. These redirecting instruction may occur in a row, or in some cases, valid instructions may be permitted to be executed in between redirecting instructions during an attack to try to prevent detection of the attack. Thus, some embodiments may be directed to using a two counter approach to filter out false positives from actual ROP attacks.

As illustrated in FIG. 1, computing device 101 may include an invalid target address counter 116 and an execution instruction counter 118 which may be used to filter out false positive ROP attacks. Moreover, the invalid target address counter 116 may be any type of counter and may be incremented or decremented until an invalid target address threshold is reach or surpassed as determined by a comparison component 144. For example, the invalid target address counter 116 may be set at zero and may be incremented by one until the invalid target address threshold is reached and determined by the comparison component 144. Alternatively and in another example, the invalid target address counter 116 may be set and decremented by one until zero is reached or any other threshold value. Further, the invalid target address threshold may be value set or determined based on a particular application 120 executing on or by computing device 101. More specifically and in some embodiments, the invalid target address threshold may be different for each application 120 for execution on the computing device 101. Applications 120 determined to be more at risk of being attacked by an ROP attack may set the invalid target address threshold less than other applications 120 less likely to be attacked, for example. Other factors may also contributed to determining the invalid target address threshold including the ease of attacking the application, a user configuration, previous attempts of attacking the application, and so forth. Various embodiments are not limited in this manner.

The execution instruction counter 118 may keep track of the number of execution instructions that validly occurred while execution tracking is enabled or an application is being monitored for a possible ROP attack. In some embodiments, the execution instruction counter 118 may keep track of a number of execution of basic blocks as a coarse grain approach. The execution instruction counter 118 may be any type of counter and may be incremented or decremented until an execution instruction threshold is reach or surpassed as determined the comparison component 144. In some embodiments, the execution instruction counter 118 may be set to the execution instruction threshold and may be decremented by one until zero is reached. Various embodiments are not limited in this manner. As similarly discussed above, the execution instruction threshold may be a value determined or based on a number of factors for each application 120 including, but not limited to, application attack risk, user configuration, previous attack attempts and so forth. In some embodiments, one or both of the invalid target address threshold and the execution instruction threshold may be set by another application such as an anti-virus application.

The invalid target address counter 116 and the execution instruction counter 118, in combination, may be used to detect ROP attacks while filtering out possible false positive detections. For example, a security measure to thwart an ROP attack may only be initiated on the computing device 101 by a security component 148 if the invalid target address threshold is reached prior to the execution instruction threshold being reached. Alternatively, if the execution instruction threshold is reached prior to a security measure being initiated and the invalid target address threshold being reached, one or both counters may be reset to zero and execution tracking may be disabled. These and other details will become more apparent with the following description.

In some embodiments, the validation component 146 may enable execution tracking when the first invalid target address is determined for an application 120. During execution tracking various functions and routines may be disabled, such as optimizations may be disabled, fast lookup tables may be disabled, translation blocks may be unlinked and so forth to protect computing device 101 from a possible ROP attack. Further, execution tracking may be disabled such that an accurate number of valid execution instructions is kept track of. Execution tracking may be enabled when a suspected ROP attack is occurring and may be disabled once a determination is made that the detection was a false positive. More specifically, the execution tracking may be disabled when the execution instruction counter reaches or surpasses the execution instruction threshold and execution tracking may be re-enabled.

Figure 2:
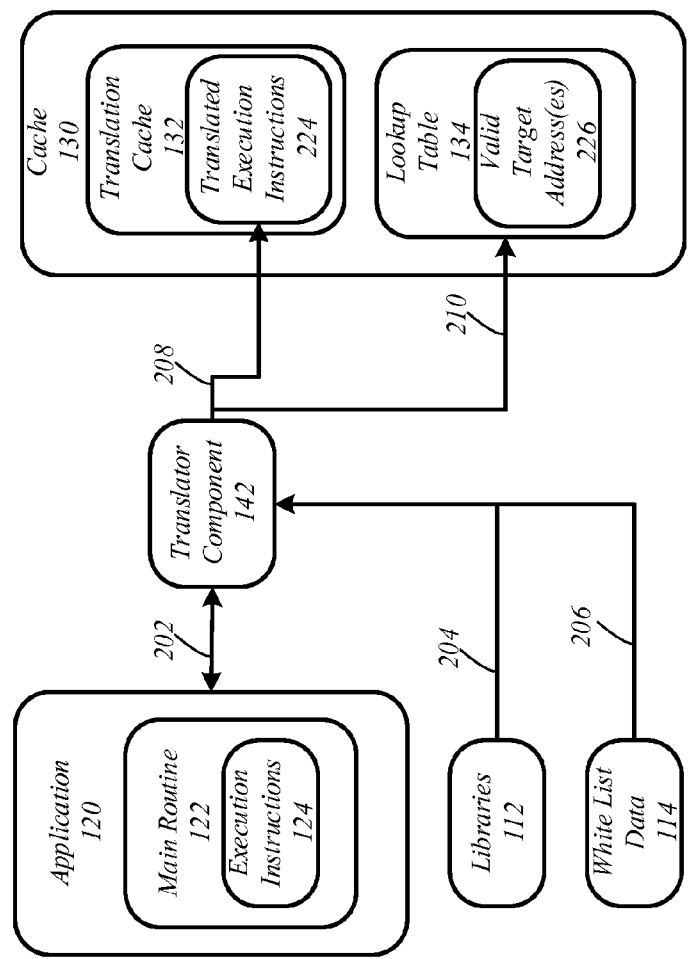
FIG. 2 illustrates an embodiment of an information flow diagram.
Figure 3:
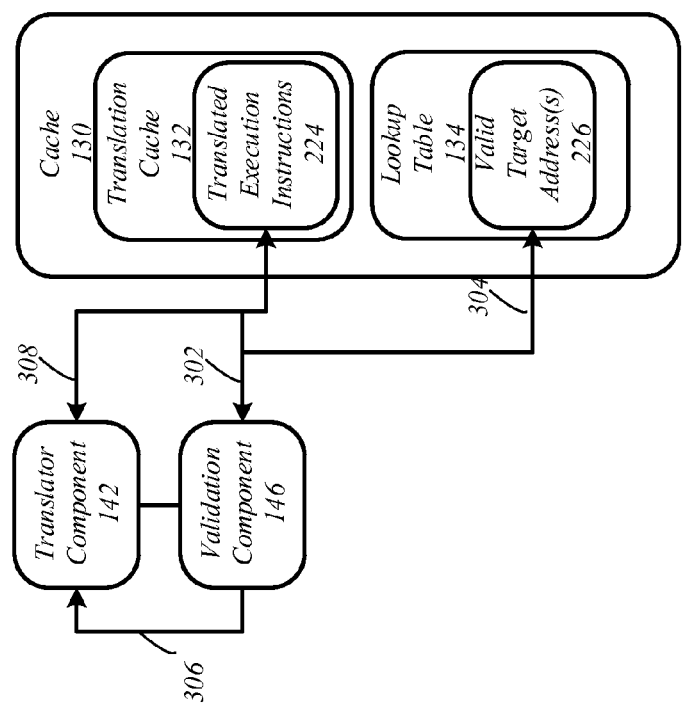
FIG. 3 illustrates a second embodiment of an information flow diagram.
Figure 4:
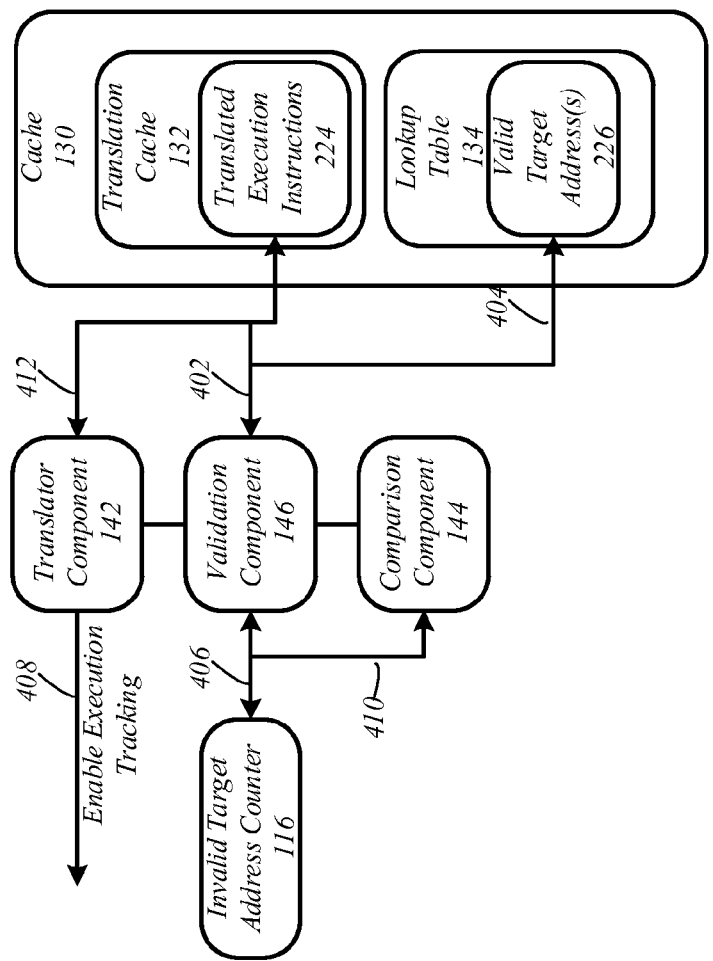
FIG. 4 illustrates a third embodiment of an information flow diagram.
Figure 5:
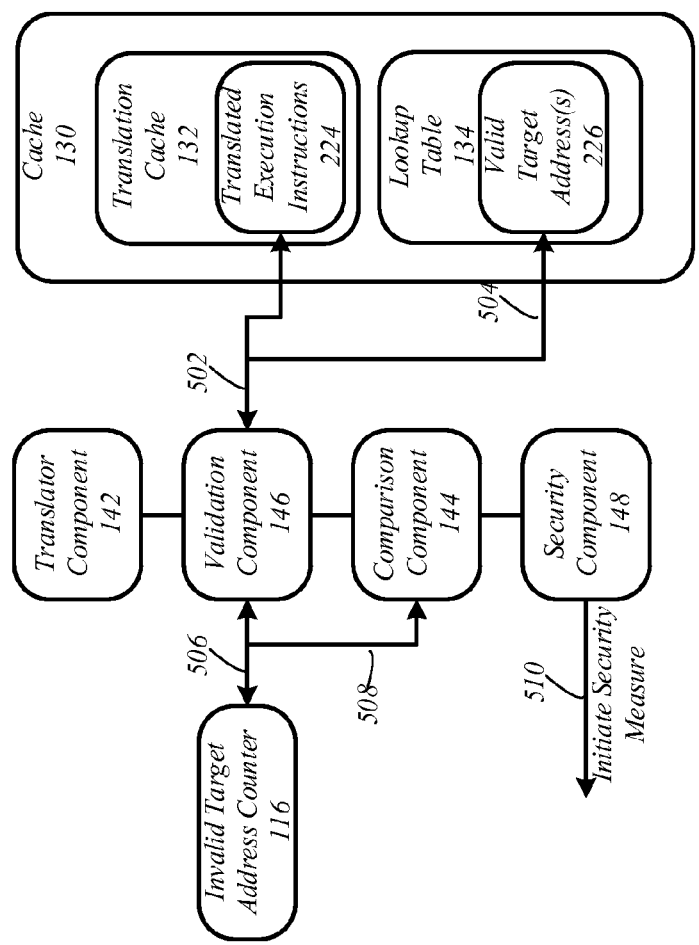
FIG. 5 illustrates a fourth embodiment of an information flow diagram.
Figure 6:
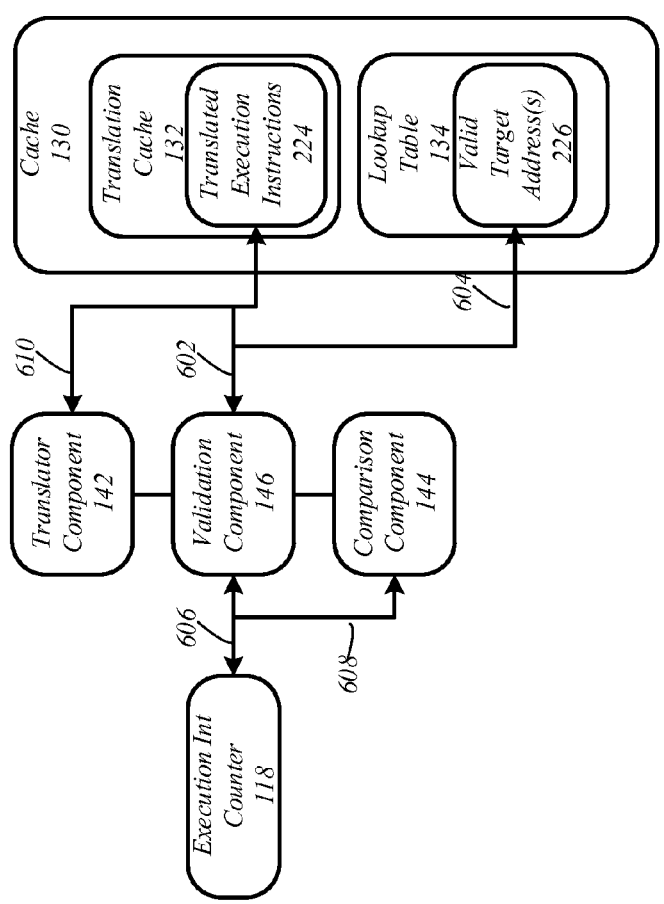
FIG. 6 illustrates a fifth embodiment of an information flow diagram.
Figure 7:
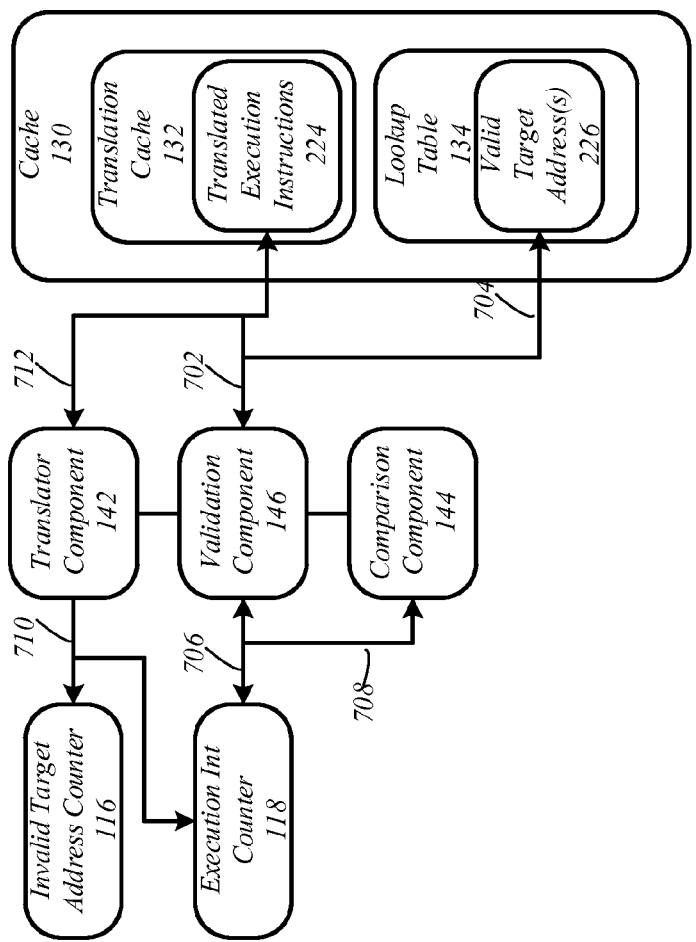
FIG. 7 illustrates a sixth embodiment of an information flow diagram.

FIGS. 2-7 illustrate embodiments of information flow diagrams and illustrates examples of various events that may occur on a computing device while executing an application and performing translations. For example, FIG. 2 illustrates information flow 200 during a translation routine, FIG. 3 illustrates information flow 300 during a successful validation of an execution instruction, FIG. 4 illustrates information flow 400 during a detection of invalid target address prior to reaching an invalid target address threshold, FIG. 5 illustrates information flow 500 during a detection of an invalid target address and performing a security measure, FIG. 6 illustrates information flow 600 during a valid target address detection while execution tracking is enabled, and FIG. 7 illustrates information flow 700 during a valid target address detection and the execution instruction threshold being reached or surpassed. Various embodiments are not limited to these particular flow diagrams and other flows and may be contemplated.

In some embodiments, information flow diagram 200 may process a main routine 122 and execution instructions 124 of an application 120 by translator component 142. As previously discussed, the translator component 142 may translate execution instructions 124 to determine valid target addresses. At line 202, the translator component 142 may read or receive execution instructions 124 for an application 120 to be translated prior to the application 120 actually being executed or during the execution of the application 120. In some embodiments, the translation of some execution instructions 124 may occur while other, already translated execution instructions, are executing. In another words, an entire application 120 does not need to be translated prior to the beginning of execution of the application 120 on a computing device.

At line 204, the translator component 142 may determine valid target addresses for execution instructions 124 from one or more libraries 112 stored on a computing device including with an operating system, for example. As previously mentioned, an operating system may include libraries that change infrequently over time, and therefore, target addresses for instructions of these libraries 112 may be easily determined. Further and at line 206, the translator component 142 may also determine target addresses for execution instructions 124 based on information stored in a white list data 114.

At line 208, the translator component 142 may communicate translated execution instructions to cache 130, and in particular, translation cache 132. The translated execution instructions may be stored in the translation cache 132 as execution instructions 224. The translated execution instructions 224 may be used for execution of the application 120 instead of execution instructions 124. Further, the translator component 142 may send determined valid target addresses 226 for storage in lookup table 134 at line 210. The valid target addresses 226 may be used by the validation component 146 to validate target addresses during the actual execution of the application 120 and determine whether an ROP attack is occurring.

In various embodiments, the translator component 142 may perform a translation routine prior to execution of an application 120 or dynamically during execution of an application 120. Further, the translator component 142 may determine valid target addresses for indirect branch instructions from the executable files stored in storage or the execution instructions that are loaded into a memory, such as memory 104, during runtime of an application 120. Various embodiments are not limited in this manner.

In some embodiments, the translated execution instructions 224 may include relative offsets for direct branch instructions within the translation cache 132 and stubs for indirect branch instructions that cause the flow of execution to be directed back to a translator component 144 or directly to the lookup table 134 to check whether target addresses stored in the lookup table 134 are valid. Presuming that there has not been a stack overflow or other malicious action during execution of a translated portion of whatever routine was placed in the translation cache 367 up to that stub instruction, there should be a match for the target address of the target to which the indirect branch instruction would direct the flow of execution. Upon determining that there is a match, the translation routine 340 permits that indirect branch instruction to be executed. Different types of stub instruction are substituted for different types of indirect branch instruction. Thus, a different type of stub instruction may be associated with each of indirect jump instructions, call instructions and return instructions. In some instances, a target validating instruction may be placed in the translated execution instructions 224 instead of using the stub instruction.

FIG. 3 illustrates an embodiment of an information flow diagram 300 to process and execute an application 120 and translated execution instructions 224. More specifically, information flow diagram 300 illustrates an application 120 and executions instructions 224 executing on a computing device. In FIG. 3, the translator component 142 may control and manage the execution of the translated executions instructions 224. For example, the translator component 142 control the flow of the translated execution instructions 224 including executing direct branch instructions and indirect branch instructions once they are verified based on valid target addresses.

At line 302, the validation component 146 may receive an intended target address for a translated execution instruction 224, and in particular, an indirect branch instruction. The intended target must be validated by the validation component 146 before the instruction is executed on the computing device. The validation component 146 may read and retrieve a valid target address 226 from the lookup table 134 at line 304. The validation component 146 may do a comparison to ensure that the intended target address matches the valid target address for the execution instruction that is be executed. In this illustrated example in FIG. 3, the validation component 146 determines that the intended target address is valid based on the comparison.

At line 306, the validation component 146 may communicate information to the translator component 142 indicated that the translated execution instruction 224 has been validated and may be executed on the computing device. The translator component 142 may proceed with executing the execution instruction. Information flow diagram 300 may be repeated any number of times and each time a target address for a translated execution instruction 224 needs to be validated.

FIG. 4 illustrates an embodiment of an information flow diagram 400 to process and execute an application 120 and translated execution instructions 224. More specifically, information flow diagram 400 illustrates an application 120 and translated execution instructions 224 including direct and indirect branch instructions executing on a computing device. In FIG. 4, the translator component 142 may control and manage the execution of the translated executions instructions 224. In this embodiment, an intended target address for an execution instruction 224 is not validated by the validation component 146.

At line 402, the validation component 146 may receive an intended target address for a translated execution instruction 224, and in particular, an indirect branch instruction. The intended target address may be validated by the validation component 146 before the instruction is executed on the computing device. The validation component 146 may read and retrieve a valid target address 226 from the lookup table 134 at line 404. The validation component 146 may do a comparison to ensure that the intended target address matches the valid target address for the translated execution instruction 224 that is be executed. As mentioned, in this example, the intended target address for the instruction cannot be validated by the validation component 146 because the intended target address does not match the valid target address in the lookup table 134.

The validation component 146 may communicate information to the invalid target address counter 116 indicate that an invalid target address has been detected and to increment (or decrement) by one. Further, the validation component 146 may communicate similar information to the translator component 142 which may enable execution tracking if it is not enabled at line 408. The validation component 146 may communicate the information to the invalid target address counter 116 and the translator component 142 concurrently in some embodiments and various embodiments are not limited in this manner.

Further and at line 410, the comparison component 144 may determine whether the invalid target address counter 116 reaches (or exceeds) an invalid target address threshold. As previously mentioned, the invalid target address threshold may be based on one or more factors, such as application attack risk, user configuration, and previous attack attempts. In some embodiments, when the invalid target address counter 116 reaches (or exceeds) the invalid target threshold one or more security measures may be initiated. However, in this example, the comparison component 144 determines that the invalid target address counter 116 has not reached (or exceeded) the invalid target address threshold and the execution instruction is permitted to be executed. More specifically and at line 412, the translator component 142 executes the translated execution instruction 224 with the invalid target address.

FIG. 5 illustrates an embodiment of an information flow diagram 500 to process and execute an application 120 and translated execution instructions 224. More specifically, information flow diagram 500 illustrates an application 120 and translated execution instructions 224 including direct and indirect branch instructions executing on a computing device. In FIG. 5, the translator component 142 may control and manage the execution of the translated executions instructions 224. In this embodiment, an intended target address for an execution instruction 224 is not validated by the validation component 146, as similarly discussed above with respect to FIG. 4.

For example and a line 502, the validation component 146 may receive or retrieve an intended target address for an indirect branch instruction. Further, at line 504 the validation component 146 may compare the intended target address with the valid target address 226 in lookup table 134. The validation component 146 may determine that the intended target address is invalid and send information to the invalid target address counter 116 at line 506, and in some embodiments the translator component 142 and comparison component 144. Further, execution tracking may be enabled if it is disabled when the validation component 146 invalidates the intended target address.

At line 508, the comparison component 144 may make a comparison to determine whether the invalid target address counter 116 has reached (or exceeded) the invalid target address threshold. In this example, the invalid target address counter 116 has reached (or exceeded) the target address threshold indicating that a possible ROP attack may be occurring. At line 510, the security component 148 may initiate one or more security measures to protect the computing device from the ROP attack. For example, the security component 148 may kill the execution of the application 120 that is suspected for the ROP attack. In another example, the security component 148 may try and quarantine the execution instructions that are being taken over by the ROP attack. In a third example, the security component 148 may notify another piece of software, such as an anti-virus software application, so that it may handle the ROP attack. Various embodiments are not limited in this manner and other security measures may be initiated.

FIG. 6 illustrates an embodiment of an information flow diagram 600 to process and execute an application 120 and translated execution instructions 224 when execution tracking is enabled. As previously mentioned, execution tracking may be enabled when an invalid target address is detected. The execution tracking may remain enabled until a security measure is initiated due to a possible ROP attack or a predetermined number of valid execution instructions occur after the first invalid target address is found. In this illustrated embodiment of FIG. 6 the execution tracking is enabled, a target address is verified, but the execution instruction counter is not greater than an execution instruction threshold.

As similarly discussed above with respect to FIGS. 3 through 5, the validation component 146 may receive an intended target address for an indirect branch instruction at line 602. Further, the validation component 146 may validate the intended target address by comparing it with a valid target address 226 in the lookup table 134 at line 604. As mentioned, in this example the intended target address is valid. At line 606, the validation component 146 may increment (or decrement) the execution instruction counter 118 since execution tracking is enabled.

At line 608, the comparison component 144 may compare the execution instruction counter 118 with an execution instruction threshold which may be predetermined or based on one or more factors, such as an ROP attack risk, user configuration, or previously ROP attack attempts. For example, the execution instruction threshold may be adjusted based on a number of "valid" target addresses between invalid target addresses that were detected during previous ROP attacks. In other words, the components may "learn" from previous ROP attacks an appropriate number of valid target addresses between invalid target addresses that indicate whether an attack is occurring or if a false positive has been detected. In this example, the execution instruction counter 118 is not greater than the execution instruction threshold. At line 610, the current execution instruction may be processed or executed, execution tracking may remain enabled.

FIG. 7 illustrates an embodiment of an information flow diagram 700 to process and execute an application 120 and translated execution instructions 224 when execution tracking is enabled. As previously mentioned, execution tracking may be enabled when an invalid target address is detected. The execution tracking may remain enabled until a security measure is initiated due to a possible ROP attack or a predetermined number of valid execution instructions occur after the first invalid target address is found. In this illustrated embodiment of FIG. 7 the execution tracking is enabled, a target address is verified, and the execution instruction counter is greater than the execution instruction threshold.

In FIG. 7, lines 702 through 706 are the same as lines 602 through 606 of FIG. 6. However, at line 708 the comparison component 144 determines that the execution instruction counter 118 is greater than the execution instruction threshold. Thus, the execution tracking may be disabled and a false positive was likely detected. Further and at line 710, the translator component 142 may reset one or both of the invalid target address counter 116 and the execution instruction counter 118. The counters may be reset to zero or any other starting value.

FIGS. 2 through 7 illustrate certain communication occurring in a certain order. However, various embodiments are not limited in this manner and one or more communications may occur in parallel or concurrently. In addition, FIGS. 2 through 7 only show a limited number of communications occurring between the various components of a computing device. Various embodiments may not be limited in this manner as well. Other information may be communicated between the components of the computing device such that ROP attacks and false positives may be detected and readily handle without causing harm to the device.

Figure 8:
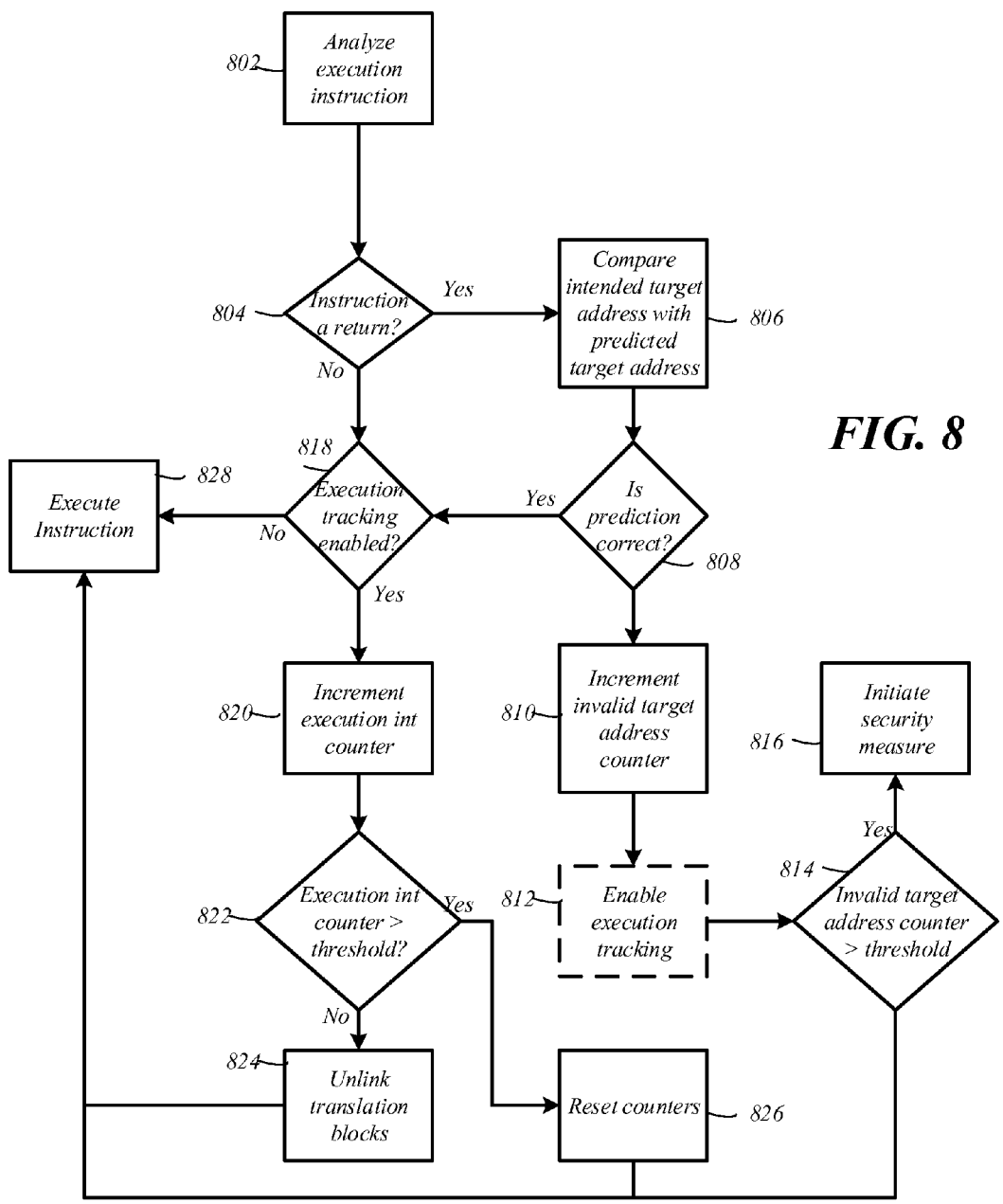
FIG. 8 illustrates an embodiment of a logic flow diagram.

FIG. 8 illustrates an embodiment of a logic flow 800 for processing execution instructions including direct branch instruction and indirect branch instructions. In various embodiments, logic flow 800 may be implemented and executed on any computing system or computing device, such as computing device 101 as illustrated in FIG. 1. Further, logic flow 800 shows a number of logic steps or blocks occurring in certain order or sequence. Various embodiments are not limited in this manner and certain blocks may occur before and/or after other blocks, as one contemplated in the art will understand.

At block 802, an execution instruction may analyzed during execution of an application and a determination may be made as to whether the execution instruction is a return (RET) instruction or another type of instruction, such as an indirect branch instruction or a direct branch instruction at block 804. Further and as previously mentioned, execution instructions may be translated prior execution of an application or dynamically when an application is being executed. During translation, execution instructions may be analyzed and if they are direct branch instructions that may be copied and stored in the cache with offsets. However, if the execution instructions are indirect branch instructions, a stub instruction may be placed in the cache in place of the execution instruction and a return target address may be predicted and stored in a lookup table.

If the execution instruction is a RET instruction, a comparison may be made to determine whether the intended target address of the RET instruction matches the predicted target address at block 806. More specifically, the predicted target address for the RET instruction may be read or retrieved from a lookup table and compared to the intended target address for the RET instruction being executed. As mentioned, during an ROP attack a different target address may be substituted for a RET instruction to redirect the execution of the application to a different portion of memory or instructions such that malicious code may be executed.

At decision block 808, a determination may be made as to whether the predicted target address matches the intended target address for the RET instruction. If they do match, a determination as to whether execution tracking is enabled may be made at decision block 818 and the instruction may be executed at block 828. However, if the predicted target address does not match the intended target address an invalid target address counter may be increment (or decremented) at block 810. Further, execution tracking may be enabled at block 812 if it is not already enabled.

In some embodiments, as determined at decision block 814 if the invalid target address counter is greater than an invalid target address threshold one or more security measures may be initiated at block 816. For example, execution of the application may be suspended or halted, execution instructions with the invalid target addresses may be quarantined, and/or an anti-virus program may be notified to handle the ROP attack. Alternatively, if the invalid target address counter is not greater than the invalid target address threshold, the execution instruction may be executed at block 828. Although decision block 814 indicates the counter must be greater than the threshold, various embodiments are not limited in this manner. The counter and threshold may be configured in any number of ways. For example, the security measure may be initiated when the invalid target address counter equals the invalid target address threshold.

In some embodiments, a determination may be made as to whether execution tracking is enabled at block 818. For example, if the execution is not a RET instruction, or if the predicted target address matches the intended target address, block 818 may occur. Execution tracking may be used to filter out false positive detections and be enabled if a previous execution instruction had an invalid target address. As mentioned, one of the hallmarks of an ROP attack is back-to-back execution instructions with invalid target addresses or in some instances a predictable number of a valid execution instruction in between invalid target instructions. Thus, execution tracking may be enabled until a number of valid execution instructions is greater than an execution instruction threshold.

More specifically and if execution tracking is enabled at block 818, an execution instruction counter may be incremented (or decremented) at block 820. Further, a determination may be made at decision block 822 as to whether the execution instruction counter is greater than an execution instruction threshold. The execution instruction threshold may be predetermined, or determined based on a number of factors including previously ROP attacks, user configuration, anti-virus software configuration, security configuration, and so forth. Further, decision block 822 indicates the counter must be greater than the threshold, various embodiments are not limited in this manner. The counter and threshold may be configured in any number of ways.

At block 826, one or both of the execution instruction counter and the invalid target address counter may be reset to initial values, such as zero, one or any other initial value. In addition, execution tracking may be disabled and, at block 828, the current execution instruction may be executed. If at decision block 822, the execution instruction counter is not greater than the execution instruction threshold, translation blocks may be unlinked at block 824, and the execution instruction may be executed at block 828. The translation blocks may be unlinked such that a translator component can get control of execution flow on every translation block. The translator component may track the number of instructions of basic blocks executed for use in updating an execution instruction counter.

FIG. 9 illustrates an embodiment of a logic flow 900. The logic flow may be representative of some or all of the operations executed by one or more embodiments described herein. For example, the logic flow 900 may illustrate operations performed by the systems and logic flows of FIGS. 1-8.

In the illustrated embodiment shown in FIG. 9, the logic flow 900 may include determining whether a target address of a register for an execution instruction is valid or invalid based on a comparison between the target address and one or more valid target addresses stored in a storage at block 905. As previously mentioned, one or more valid target address for execution instructions, such as indirect branch instructions, may be determined during a translation routine or process and stored in memory or storage, such as in a fast lookup table. During execution of the execution instruction, an intended target address for the instruction may be determined and compared with the stored valid target address.

At block 910, the logic flow 900 may include increasing a number of invalid target addresses if the target address is invalid. For example, a counter, such as an invalid target address counter, may be incremented (or decremented) when the comparison determines that the intended target address is invalid. Further, the logic flow 900 may include determining whether the number of invalid target addresses is greater than an invalid target address threshold at block 915. More specifically, a comparison may be made to determine whether the counter is greater than or equal to a threshold value. In some embodiments when the counter is counter down to a threshold value, the comparison may determine whether the number is less than the threshold value. Various embodiments are not limited in this manner.

The logic flow 900 may also include initiating a security measure to prevent a security breach if the number of invalid target addresses is greater than the invalid target address threshold at block 920. As previously discussed, a number of security measures, such as halted the execution of an application, performing an anti-virus scan, and quarantining the suspected execution instruction, may be initiated if an attack is suspected. However, in some embodiments the logic flow 900 includes execute the execution instruction if the number of invalid target addresses is less than or equal to the invalid target address threshold at block 925. As previously mentioned a predetermined or defined number of invalid target addresses are permitted before a security measure is initiated to filter out false positive detections. Various embodiments are not limited in this manner.

Figure 10:
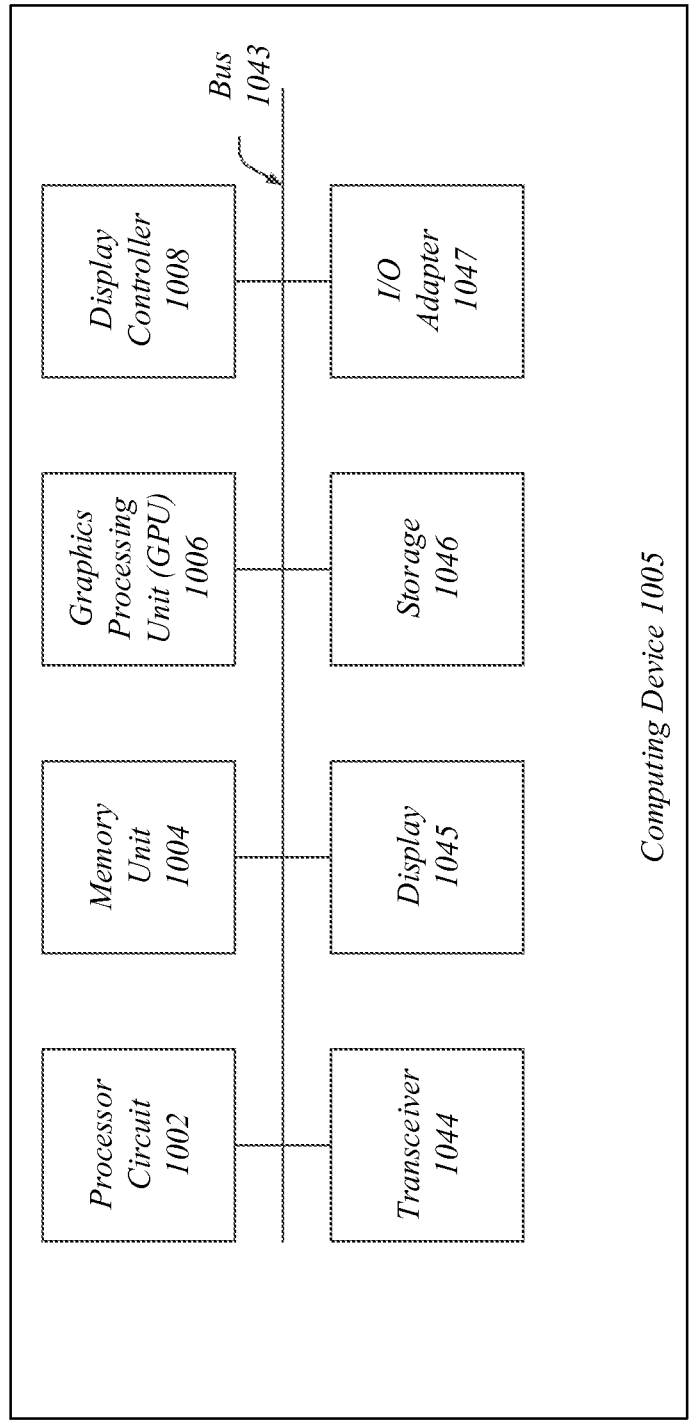
FIG. 10 illustrates an exemplary embodiment of a computing system.

FIG. 10 illustrates one embodiment of a system 1000. In various embodiments, system 1000 may be representative of a system or architecture suitable for use with one or more embodiments described herein, such as system 100 of FIG. 1. The embodiments are not limited in this respect.

As shown in FIG. 10, system 1000 may include multiple elements. One or more elements may be implemented using one or more circuits, components, registers, processors, software subroutines, modules, or any combination thereof, as desired for a given set of design or performance constraints. Although FIG. 10 shows a limited number of elements in a certain topology by way of example, it can be appreciated that more or less elements in any suitable topology may be used in system 1000 as desired for a given implementation. The embodiments are not limited in this context.

In various embodiments, system 1000 may include a computing device 1005 which may be any type of computer or processing device including a personal computer, desktop computer, tablet computer, netbook computer, notebook computer, laptop computer, server, server farm, blade server, or any other type of server, and so forth.

Other examples of computing device 1005 also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a computing device 1005 may be implemented as a smart phone capable of executing computer applications, as well as voice communications and/or data communications. Although some embodiments may be described with a computing device 1005 implemented as a smart phone by way of example, it may be appreciated that other embodiments may be implemented using other wireless computing devices as well. The embodiments are not limited in this context.

In various embodiments, computing device 1005 may include processor circuit 1002. Processor circuit 1002 may be implemented using any processor or logic device. The processing circuit 1002 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing circuit 1002 may be connected to and communicate with the other elements of the computing system via an interconnect 1043, such as one or more buses, control lines, and data lines.

In one embodiment, computing device 1005 may include a memory unit 1004 to couple to processor circuit 1002. Memory unit 1004 may be coupled to processor circuit 1002 via communications bus 1043, or by a dedicated communications bus between processor circuit 1002 and memory unit 1004, as desired for a given implementation. Memory unit 04 may be implemented using any machine-readable or computer-readable media capable of storing data, including both volatile and non-volatile memory. In some embodiments, the machine-readable or computer-readable medium may include a non-transitory medium. The embodiments are not limited in this context.

Computing device 1005 may include a graphics processing unit (GPU) 1006, in various embodiments. The GPU 1006 may include any processing unit, logic or circuitry optimized to perform graphics-related operations as well as the video decoder engines and the frame correlation engines. The GPU 1006 may be used to render 2-dimensional (2-D) and/or 3-dimensional (3-D) images for various applications such as video games, graphics, computer-aided design (CAD), simulation and visualization tools, imaging, etc. Various embodiments are not limited in this manner; GPU 1006 may process any type of graphics data such as pictures, videos, programs, animation, 3D, 2D, objects images and so forth.

In some embodiments, computing device 1005 may include a display controller 1008. Display controller 1008 may be any type of processor, controller, circuit, logic, and so forth for processing graphics information and displaying the graphics information. The display controller 1008 may receive or retrieve graphics information from one or more buffers, such as buffer(s) 220. After processing the information, the display controller 1008 may send the graphics information to a display.

In various embodiments, system 1000 may include a transceiver 1044. Transceiver 1044 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 1044 may operate in accordance with one or more applicable standards in any version. The embodiments are not limited in this context.

In various embodiments, computing device 1005 may include a display 1045. Display 1045 may constitute any display device capable of displaying information received from processor circuit 1002, graphics processing unit 1006 and display controller 1008.

In various embodiments, computing device 1005 may include storage 1046. Storage 1046 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 1046 may include technology to increase the storage performance enhanced protection for valuable digital media when multiple hard drives are included, for example. Further examples of storage 1046 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, computing device 1005 may include one or more I/O adapters 1047. Examples of I/O adapters 1047 may include Universal Serial Bus (USB) ports/adapters, IEEE 1394 Firewire ports/adapters, and so forth. The embodiments are not limited in this context.

Figure 11:
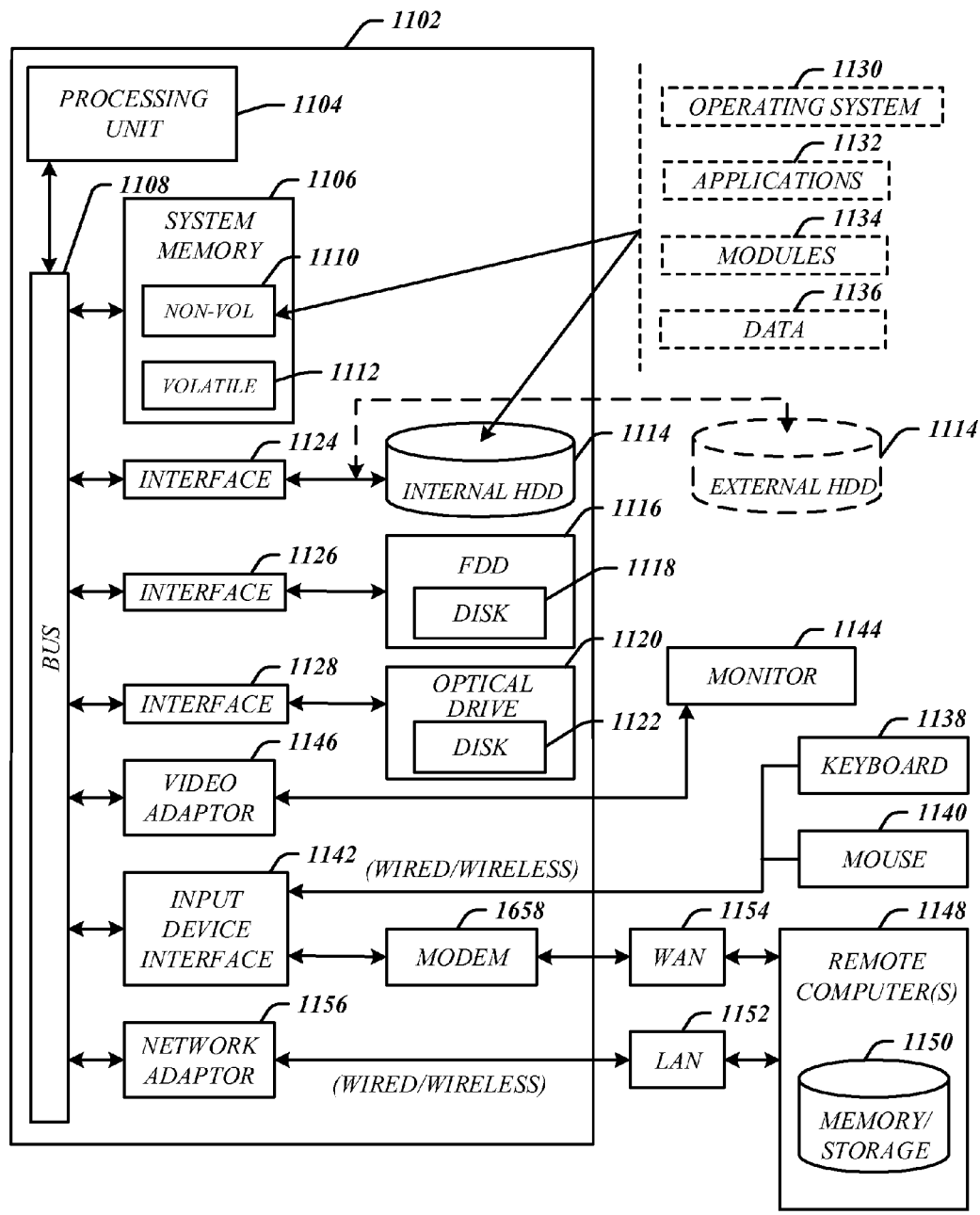
FIG. 11 illustrates an exemplary embodiment of a computing architecture.

FIG. 11 illustrates an embodiment of an exemplary computing architecture 1100 suitable for implementing various embodiments as previously described. In one embodiment, the computing architecture 1100 may include or be implemented as part of systems 100.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 includes a processing unit 1104, a system memory 1106 and a system bus 1108. The processing unit 1104 can be any of various commercially available processors.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the system 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 1102 family of standards, such as wireless devices operatively disposed in wireless communication (e.g., IEEE 1102.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 1102.11x (a, b, g, n, etc.) to provide secure, reliable, fast wireless connectivity. A Wi-Fi network can be used to connect computers to each other, to the Internet, and to wire networks (which use IEEE 1102.3-related media and functions).

The various elements of the systems 100, 1500, 1100 as previously described with reference to FIGS. 1-16 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through twenty-five (1-25) provided below are intended to be exemplary and non-limiting.

In a first example, an article comprising a non-transitory computer-readable storage medium comprising a plurality of instructions that when executed enable processing circuitry to determine whether a target address of a register for an execution instruction is valid or invalid based on a comparison between the target address and one or more valid target addresses stored in a storage, increase a number of invalid target addresses when the target address is invalid, determine whether the number of invalid target addresses is greater than an invalid target address threshold, and initiate a security measure to prevent a security breach when the number of invalid target addresses is greater than the invalid target address threshold.

In a second example and in furtherance of the first example, a plurality of instructions that when executed enable a processing circuitry to determine whether a number of valid execution instructions is greater than an execution instruction threshold, and reset a counter for the number of invalid target addresses and a counter for the number of valid execution instructions when the number of valid execution instructions is greater than the execution instruction threshold.

In a third example and in furtherance of any of the previous examples, a plurality of instructions that when executed enable a processing circuitry to enable an execution tracking routine when the target address of the register is invalid, the execution tracking routine to disable one or more optimizations and fast lookup tables.

In a fourth example and in furtherance of any of the previous examples, a plurality of instructions that when executed enable a processing circuitry to perform the execution instruction when the target address is valid or if the number of invalid target addresses is less than or equal to the invalid target address threshold.

In a fifth example and in furtherance of any of the previous examples, wherein the execution instruction is part of a main routine of an application stored in the storage. In a sixth example and in furtherance of any of the previous examples, a plurality of instructions that when executed enable a processing circuitry to perform a translation routine on one or more routines to determine one or more valid target addresses and store the one or more valid target addresses in a lookup table.

In a seventh example and in furtherance of any of the previous examples, a plurality of instructions that when executed enable a processing circuitry to determine at least one of the invalid target address threshold and the execution instruction threshold based on a security setting.

In an eighth example and in furtherance of any of the previous examples, a plurality of instructions that when executed enable a processing circuitry the security measure comprising a plurality of instructions that when executed enable the processing circuitry to disable a main routine for the execution instruction and/or report a security breach attempt to a security component.

In a ninth example and in furtherance of any of the previous examples, a method may include determining whether a target address of a register for an execution instruction is valid or invalid based on a comparison between the target address and one or more valid target addresses stored in a storage, increase, a number of invalid target addresses when the target address is invalid, determining whether the number of invalid target addresses is greater than or equal to an invalid target address threshold and initiating a security measure to prevent a security breach when the number of invalid target addresses is greater than or equal to the invalid threshold.

In a tenth example and in furtherance of any of the previous examples, a method may include determining whether a number of valid execution instructions is greater than an execution instruction threshold, and resetting a counter for the number of invalid target addresses and a counter for the number of valid execution instructions when the number of valid execution instructions is greater than the execution instruction threshold.

In an eleventh example and in furtherance of any of the previous examples, a method may include enabling an execution tracking routine when the target address of the register is invalid, the execution tracking routine to disable one or more optimizations and one or more fast lookup tables.

In a twelfth example and in furtherance of any of the previous examples, a method may include performing the execution instruction when the target address is valid or if the number of invalid target addresses is less than or equal to the invalid target address threshold.

In a thirteenth example and in furtherance of any of the previous examples, a method may include the execution instruction is part of a main routine of an application stored in the storage.

In a fourteenth example and in furtherance of any of the previous examples, a method may include performing a translation routine on one or more routines to determine one or more valid target addresses, and storing the one or more valid target addresses in a lookup table.

In a fifteenth example and in furtherance of any of the previous examples, a method may include determining at least one of an invalid target address threshold and an execution instruction threshold based on a security setting.

In a sixteenth example and in furtherance of any of the previous examples, a method may include the security measure comprising disabling a main routine for the execution instruction and/or report a security breach attempt to a security component.

In a seventeenth example and in furtherance of any of the previous examples, a system, a device or an apparatus may include memory, storage, processing circuitry comprising one or more registers, and a validation component executable on the processing circuitry to determine whether a target address of a register of the one or more registers for an execution instruction is valid or invalid based on a comparison between the target address and one or more valid target addresses stored in the storage and decrease a number of invalid target addresses when the target address is invalid. The apparatus may include a comparison component executable on the processing circuitry to determine whether a number of invalid target addresses is less than or equal to an invalid target address threshold and a security component executable on the processing circuitry to initiate a security measure to prevent a security breach when the number of invalid target addresses is equal to or less than the invalid threshold.

In an eighteenth example and in furtherance of any of the previous examples, a system, a device or an apparatus may include the comparison component to determine whether a number of valid execution instructions is greater than an execution instruction threshold, and the translator component to reset a counter for the number of invalid target addresses and a counter for the number of valid execution instructions when the number of valid execution instructions is greater than the execution instruction threshold.

In a nineteenth example and in furtherance of any of the previous examples, a system, a device or an apparatus may include the translator component to enable an execution tracking routine when the target address of the register is invalid, the execution tracking routine to disable one or more optimizations and one or more fast lookup tables.

In a twentieth example and in furtherance of any of the previous examples, a system, a device or an apparatus may include the translator component to perform the execution instruction when the target address is valid or if the number of invalid target addresses is less than or equal to the invalid target address threshold.

In a twenty-first example and in furtherance of any of the previous examples, a system, a device or an apparatus may include the execution instruction is part of a main routine of an application stored in the storage.

In a twenty-second example and in furtherance of any of the previous examples, a system, a device or an apparatus may include the translator component to perform a translation routine on one or more routines to determine one or more valid target addresses, and store the one or more valid target addresses in a lookup table.

In a twenty-third example and in furtherance of any of the previous examples, a system, a device or an apparatus may include the security component to determine at least one of an invalid target address threshold and an execution instruction threshold based on a security setting.

In a twenty-fourth example and in furtherance of any of the previous examples, a system, a device or an apparatus may include the security measure to disable a main routine for the execution instruction and/or report a security breach attempt to a security agent.

In a twenty-fifth example and in furtherance of any of the previous examples, a system, a device or an apparatus may include an input/output (I/O) adapter, a transceiver, and a display controller coupled with a display, and wherein the I/O adapter, the transceiver, the display controller, the display, the memory, storage, and the processing circuitry all coupled via a bus.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An article comprising a non-transitory computer-readable storage medium comprising a plurality of instructions that when executed enable processing circuitry to:
    determine whether an execution instruction is a return instruction;
    determine whether a target address of a register for the execution instruction is valid or invalid based on a comparison between the target address and one or more valid target addresses stored in a storage when the execution instruction is a return instruction;
    increase a number of invalid target addresses when the target address is invalid;
    increase a number of valid execution instructions when the target address is valid;
    determine whether the number of valid execution instructions is greater than an execution instruction threshold when the number of valid execution instructions is increased;
    unlink a translation block when the number of valid execution instructions is not greater than the execution instruction threshold;
    determine whether the number of invalid target addresses is greater than an invalid target address threshold when the number of invalid target addresses is increased; and
    initiate a security measure to prevent a security breach when the number of invalid target addresses is greater than the invalid target address threshold.

2. The non-transitory computer-readable storage medium of claim 1, comprising the plurality of instructions that when executed enable the processing circuitry to:
    determine whether the number of valid execution instructions is greater than an execution instruction threshold when the number of valid execution instructions is increased; and
    reset a counter for the number of invalid target addresses and a counter for the number of valid execution instructions when the number of valid execution instructions is greater than the execution instruction threshold.

3. The non-transitory computer-readable storage medium of claim 2, comprising the plurality of instructions that when executed enable the processing circuitry to determine at least one of the invalid target address threshold and the execution instruction threshold based on a security setting.

4. The non-transitory computer-readable storage medium of claim 1, comprising the plurality of instructions that when executed enable the processing circuitry to enable an execution tracking routine when the target address of the register is invalid, the execution tracking routine to disable one or more optimizations and fast lookup tables.

5. The non-transitory computer-readable storage medium of claim 1, comprising the plurality of instructions that when executed enable the processing circuitry to perform the execution instruction when the target address is valid or if the number of invalid target addresses is less than or equal to the invalid target address threshold.

6. The non-transitory computer-readable storage medium of claim 1, the execution instruction is part of a main routine of an application stored in the storage.

7. The non-transitory computer-readable storage medium of claim 1, comprising the plurality of instructions that when executed enable the processing circuitry to:
    perform a translation routine on one or more routines to determine one or more valid target addresses; and
    store the one or more valid target addresses in a lookup table.

8. The non-transitory computer-readable storage medium of claim 1, the security measure comprising a plurality of instructions that when executed enable the processing circuitry to:
    disable a main routine for the execution instruction;
    report a security breach attempt to a security agent; or
    disable a main routine for the execution instruction and report a security breach attempt to a security agent.

9. A computer-implemented method, comprising:
    determining, by processing circuitry, whether an execution instruction is a return instruction;
    determining, by processing circuitry, whether a target address of a register for the execution instruction is valid or invalid based on a comparison between the target address and one or more valid target addresses stored in a storage when the execution instruction is a return instruction;
    increasing, by the processing circuitry, a number of invalid target addresses when the target address is invalid;
    increasing, by the processing circuitry, a number of valid execution instructions when the target address is valid;
    determining, by the processing circuitry, whether the number of valid execution instructions is greater than an execution instruction threshold when the number of valid execution instructions is increased;
    unlinking, by the processing circuitry, a translation block when the number of valid execution instructions is not greater than the execution instruction threshold;
    determining, by the processing circuitry, whether the number of invalid target addresses is greater than or equal to an invalid target address threshold when the number of invalid target addresses is increased; and
    initiating, by the processing circuitry, a security measure to prevent a security breach when the number of invalid target addresses is greater than or equal to the invalid threshold.

10. The computer-implemented method of claim 9, comprising:
    determining, by the processing circuitry, whether the number of valid execution instructions is greater than an execution instruction threshold when the number of valid execution instructions is increased; and
    resetting, by the processing circuitry, a counter for the number of invalid target addresses and a counter for the number of valid execution instructions when the number of valid execution instructions is greater than the execution instruction threshold.

11. The computer-implemented method of claim 9, comprising enabling, by the processing circuitry, an execution tracking routine when the target address of the register is invalid, the execution tracking routine to disable one or more optimizations and one or more fast lookup tables.

12. The computer-implemented method of claim 9, comprising performing, by the processing circuitry, the execution instruction when the target address is valid or if the number of invalid target addresses is less than or equal to the invalid target address threshold.

13. The computer-implemented method of claim 9, the execution instruction is part of a main routine of an application stored in the storage.

14. The computer-implemented method of claim 9, comprising:

performing, by the processing circuitry, a translation routine on one or more routines to determine one or more valid target addresses; and storing, by the processing circuitry, the one or more valid target addresses in a lookup table.

15. The computer-implemented method of claim 9, comprising determining, by the processing circuitry, at least one of an invalid target address threshold and an execution instruction threshold based on a security setting.

16. The computer-implemented method of claim 9, the security measure to disable a main routine for the execution instruction;
report a security breach attempt to a security agent; or
disable a main routine for the execution instruction and a report a security breach attempt to a security agent.

17. An apparatus, comprising:
memory;
storage;
processing circuitry comprising one or more registers;
a validation component executable on the processing circuitry to determine whether a target address of a register of the one or more registers for an execution instruction is valid or invalid when the execution instruction is a return instructions, the determination based on a comparison between the target address and one or more valid target addresses stored in the storage and the validation component to decrease a number of invalid target addresses when the target address is invalid and decrease a number of valid execution instructions when the target value is valid;
a comparison component executable on the processing circuitry to determine whether the number of invalid target addresses is less than or equal to an invalid target address threshold when the number of invalid target addresses is increased and determine whether the number of valid execution instructions is less than or equal to an execution instruction threshold; and
a security component executable on the processing circuitry to initiate a security measure to prevent a security breach when the number of invalid target addresses is equal to or less than the invalid threshold and unlink a translation block when the number of valid execution instructions is not less than or equal to the execution instruction threshold.

18. The apparatus of claim 17, comprising the comparison component to determine whether the number of valid execution instructions is greater than an execution instruction threshold when the number of valid execution instructions is increased, and a translator component executable on the processing circuitry to reset a counter for the number of invalid target addresses and a counter for the number of valid execution instructions when the number of valid execution instructions is greater than the execution instruction threshold.

19. The apparatus of claim 17, comprising a translator component executable on the processing circuitry to enable an execution tracking routine when the target address of the register is invalid, the execution tracking routine to disable one or more optimizations and one or more fast lookup tables.

20. The apparatus of claim 17, comprising a translator component executable on the processing circuitry to perform the execution instruction when the target address is valid or if the number of invalid target addresses is less than or equal to the invalid target address threshold.

21. The apparatus of claim 17, the execution instruction is part of a main routine of an application stored in the storage.

22. The apparatus of claim 17, comprising a translator component executable on the processing circuitry to perform a translation routine on one or more routines to determine one or more valid target addresses, and store the one or more valid target addresses in a lookup table.

23. The apparatus of claim 17, the security component to determine at least one of an invalid target address threshold and an execution instruction threshold based on a security setting.

24. The apparatus of claim 17, the security measure to:
disable a main routine for the execution instruction;
report a security breach attempt to a security agent; or
disable a main routine for the execution instruction and report a security breach attempt to a security agent.

25. The apparatus of claim 17, comprising:
an input/output (I/O) adapter;
a transceiver; and
a display controller coupled with a display,
wherein the I/O adapter, the transceiver, the display controller, the display, the memory, storage, and the processing circuitry all coupled via a bus.

* * * * *